US012188722B2

(12) United States Patent
Park et al.

(10) Patent No.: US 12,188,722 B2
(45) Date of Patent: Jan. 7, 2025

(54) MULTISTAGE VERTICAL GRAPHITIZATION FURNACE SYSTEM

(71) Applicants: EFC Co., LTD., Gwangyang-si (KR); SIS CORPORATION, Ulsan (KR); Hyeongseog Park, Yeosu-si (KR); Insung Shin, Ulsan (KR)

(72) Inventors: Hyeongseog Park, Yeosu-si (KR); Insung Shin, Ulsan (KR)

(73) Assignees: EFC CO., LTD., Gwangyang-si (KR); SIS CORPORATION, Ulsan (KR); HYEONGSEOG PARK, Yeosu-si (KR); INSUNG SHIN, Ulsan (KR)

( * ) Notice: Subject to any disclaimer, the term of this patent is extended or adjusted under 35 U.S.C. 154(b) by 0 days.

(21) Appl. No.: 18/650,080

(22) Filed: Apr. 30, 2024

(65) Prior Publication Data

US 2024/0410651 A1  Dec. 12, 2024

(30) Foreign Application Priority Data

Jun. 6, 2023  (KR) .................. 10-2023-0072508

(51) Int. Cl.
| | | |
|---|---|---|
| F27B 1/02 | (2006.01) | |
| C01B 32/205 | (2017.01) | |
| F27B 1/00 | (2006.01) | |
| F27B 1/08 | (2006.01) | |
| F27D 3/08 | (2006.01) | |
| F27D 7/02 | (2006.01) | |
| F27D 9/00 | (2006.01) | |
| F27D 11/06 | (2006.01) | |
| F27D 19/00 | (2006.01) | |

(52) U.S. Cl.
CPC ............ *F27B 1/025* (2013.01); *C01B 32/205* (2017.08); *F27B 1/005* (2013.01); *F27B 1/08* (2013.01); *F27D 3/08* (2013.01); *F27D 7/02* (2013.01); *F27D 9/00* (2013.01); *F27D 11/06* (2013.01); *F27D 19/00* (2013.01); *F27D 2009/0013* (2013.01); *F27D 2019/0009* (2013.01); *F27D 2019/0075* (2013.01)

(58) Field of Classification Search
CPC .. F27B 1/025; F27B 1/005; F27B 1/08; C01B 32/205; F27D 3/08; F27D 7/02; F27D 9/00; F27D 2009/0013; F27D 2019/0009; F27D 2019/0075
USPC ...... 373/142, 88, 57, 58, 110, 113, 114, 115, 373/117, 118, 119, 120, 122, 125, 133
See application file for complete search history.

(56) References Cited

FOREIGN PATENT DOCUMENTS

| CN | 105627746 A | * 6/2016 |
|---|---|---|
| JP | 4096402 B2 | 11/1999 |

(Continued)

*Primary Examiner* — Quang T Van
(74) *Attorney, Agent, or Firm* — Harvest IP Law LLP

(57) ABSTRACT

The present invention relates to a multistage vertical graphitization furnace system including a feed part including a silo where raw materials are stored, a low-temperature treatment part having a low-temperature heat treatment furnace which receives the raw materials from the feed part, and heats the raw materials to remove impurities, a high-temperature treatment part having a high-temperature heat treatment furnace to produce synthetic graphite, a cooling part for water-cooling the synthetic graphite produced in the high-temperature treatment part, and a discharge part for taking out the synthetic graphite discharged from the cooling part.

11 Claims, 4 Drawing Sheets

(56) References Cited

FOREIGN PATENT DOCUMENTS

| | | | |
|---|---|---|---|
| JP | 2000-97584 A | 4/2000 | |
| JP | 2005220500 A * | 8/2005 | ............. B82Y 30/00 |
| JP | 6215112 B2 | 11/2015 | |
| JP | 2015189644 A | 11/2015 | |
| KR | 10-2187024 B1 | 12/2020 | |
| KR | 10-2315610 B1 | 10/2021 | |
| KR | 10-2022-0061407 A | 5/2022 | |

* cited by examiner

MULTISTAGE VERTICAL GRAPHITIZATION FURNACE SYSTEM

CROSS-REFERENCE TO RELATED APPLICATIONS

This application claims the benefit from Korean Patent Application No. 10-2023-0072508, filed on Jun. 6, 2023, in the Korean Intellectual Property Office, the disclosure of which is hereby incorporated by reference in their entireties.

BACKGROUND OF THE INVENTION

Field of the Invention

The present invention relates to a multistage vertical graphitization furnace system, and more specifically, to a multistage vertical graphitization furnace system which produces synthetic graphite through a continuous process including a process of removing moisture and volatile components just before the graphitization process, ensuring thereby the quality improvement of synthetic graphite and safety in the manufacturing process.

Background Art

Synthetic graphite is widely used in various fields such as anode materials for secondary batteries, electrodes for iron and steel production, discharge machining electrodes, nuclear fusion reactors, semiconductors, and solar cells.

Such synthetic graphite has disadvantages of lower graphitization degree and higher manufacturing costs compared to natural graphite, but is relatively superior in lifespan, so there is an increase in demand.

Currently, the main manufacturing method of synthetic graphite includes the steps of: filling a crucible containing raw materials such as coke into a graphitization furnace (Acheson furnace), covering the crucible with a subsidiary material such as a resistance material or an insulation material, heating the crucible to high temperature of about 3,000° C. for a predetermined period of time, and then naturally cooling the crucible.

Therefore, the inventor of the present invention has developed an automated graphitization system (Patent Document 1) capable of mass-producing synthetic graphite.

The automated system, as illustrated in FIG. 1, includes: a plurality of graphitization furnace 100 arranged in parallel; rails 200 placed on the upper portion of the graphitization furnace 100; a robot 370 traveling on the rails 200 to perform crucible loading and unloading; a hopper 470 performing subsidiary material injection; and a conveyor 500 placed on one side of the graphitization furnace 100 to perform crucible loading and unloading.

However, the automated system has a limitation in increasing production efficiency due to the batch process thereof.

Therefore, the inventor has disclosed a vertical graphitization furnace system (Patent Document 2) for manufacturing synthetic graphite through a continuous process.

The vertical graphitization furnace system, as illustrated in FIG. 2, includes: a conveyor 100 for transporting and supplying raw materials; a drying part 200 for removing moisture from the raw materials; a crucible tube 310 where graphitization occurs; a body part 320 including an electrode for heating the crucible tube 310; a rotating cooling part 400 for cooling the manufactured synthetic graphite; and a processing part 500 for unloading the synthetic graphite. The conveyor part 100, the drying part 200, the crucible tube 310, the rotating cooling part 400, and the processing part 500 are arranged vertically according to the process sequence, thereby achieving high production efficiency.

Furthermore, in case of the aforementioned automated graphitization system, the graphitization furnace 100 has a long side of about 50 m, so the automated graphitization system requires a large site to construct a plurality of graphitization furnaces 100, and also requires to construct the rails 200, the conveyor 500, and structures for supporting the rails 200 on a large scale, leading to a great burden of initial installation costs.

On the other hand, the vertical graphitization furnace system can reduce and simplify such burdensome factors, and especially does not require the crucibles, which are consumable materials, thereby lowering production costs and enhancing the price competitiveness of synthetic graphite.

However, since the raw materials contain volatile substances, even though moisture is removed through the drying part 200, remaining volatile substances may agglomerate with the raw materials, thus hindering transfer of raw materials, and deteriorating the quality of synthetic graphite.

Moreover, explosion may occur due to volatile components in the raw materials, and incidents such as damage or explosion of the graphitization furnace may occur if gas generated during the graphitization process is not discharged smoothly or if a bottleneck portion is overheated.

PATENT LITERATURE

Patent Documents

Patent Document 1: Korean Patent Publication No. 10-2022-0061407 A (May 13, 2022)
Patent Document 2: Korean Patent No. 10-2315610 B1 (Oct. 15, 2021)

SUMMARY OF THE INVENTION

Accordingly, the present invention has been made to solve the above-mentioned problems occurring in the prior arts, and it is an object of the present invention to provide a multistage vertical graphitization furnace system which produces synthetic graphite through a continuous process and completely removes moisture and volatile components just before a graphitization process, thereby ensuring the quality improvement of synthetic graphite and safety in the manufacturing process.

To accomplish the above object, according to the present invention, there is provided a multistage vertical graphitization furnace system including: a feed part including a silo where raw materials are stored, a delivery means for rapidly supplying the raw materials discharged from the silo using a high-pressure blower, and a first hopper storing the raw materials introduced by the delivery means; a low-temperature treatment part having a low-temperature heat treatment furnace which receives the raw materials from the feed part, and heats the raw materials to remove impurities; a high-temperature treatment part directly connected to the low-temperature treatment part, and having a high-temperature heat treatment furnace, which heats the raw materials discharged from the low-temperature heat treatment furnace to produce synthetic graphite; a cooling part including a cooling chamber connected to an outlet of the high-temperature heat treatment furnace and a water-cooling tube which surrounds the outside of the cooling chamber and through which cooling water flows; and a discharge part taking out the synthetic graphite discharged from the cooling part.

Moreover, the feed part further includes an auxiliary hopper for temporary storage of the raw materials and an auxiliary rotary valve for accurately controlling discharge volume are additionally provided between the silo and the delivery means.

Furthermore, the multistage vertical graphitization furnace system further includes a table feeder which is provided directly below the first hopper to stably perform quantitative discharge and continuous feeding of the raw materials.

Additionally, the low-temperature heat treatment furnace has an inlet and an outlet formed at the top and bottom thereof, respectively, and a heating source of the low-temperature heat treatment furnace is a high-frequency induction coil. The high-temperature heat treatment furnace has an inlet and an outlet formed at the top and bottom thereof, respectively, and a heating source of the high-temperature heat treatment furnace is a high-frequency induction coil.

In addition, the furnace has a plurality of vents made of graphite material, and a plurality of inert gas injection means for injecting inert gas.

Moreover, a body of the high-temperature heat treatment furnace is sealed with an insulation material, the surface of the insulation material is finished with fireproof bricks, and the fireproof bricks are protected by a case made of a heat-resisting material. A cross-sectional structure of the low-temperature heat treatment furnace is the same as the high-temperature heat treatment furnace.

Furthermore, a pressure gauge and a pyrometer are additionally installed inside the low-temperature heat treatment furnace for real-time monitoring, and when detecting abnormality, the vents are automatically opened.

Additionally, a buffer part is arranged between the high-temperature heat treatment furnace and the cooling chamber so that synthetic graphite is initially cooled while passing through the buffer part.

In addition, the discharge part includes: a gate connected to the outlet of the cooling chamber; and a second rotary valve and a screw conveyor sequentially arranged below the gate and interconnected with each other.

Moreover, when the gate is opened, the second rotary valve discharges the synthetic graphite at a unit amount per hour by counting the number of rotations of a valve body, after the unit amount is discharged, and the first rotary valve is activated to replenish a predetermined amount of raw materials per hour into the low-temperature heat treatment furnace. The first rotary valve split-feeds the raw materials based on the maximum capacity and retention time of the high-temperature heat treatment furnace.

Furthermore, an inert gas injection means is provided in the cooling chamber to inject inert gas at high pressure from the top of the cooling chamber towards the outlet.

According to the present invention, the multistage vertical graphitization furnace system of the present invention can enhance production efficiency and management convenience by arranging the low-temperature heat treatment furnace, the high-temperature heat treatment furnace, and the cooling tank in a row.

Furthermore, the multistage vertical graphitization furnace system of the present invention enhances the quality of synthetic graphite can remove moisture and volatile components through the low-temperature treatment part before the graphitization process of the high-temperature treatment part, thereby increasing the quality of synthetic graphite and enhancing process safety and commercial competitiveness.

DETAILED DESCRIPTION OF THE PREFERRED EMBODIMENT

Hereinafter, a preferred embodiment of the present invention will be described in more detail with reference to the attached drawings.

Figure 1:
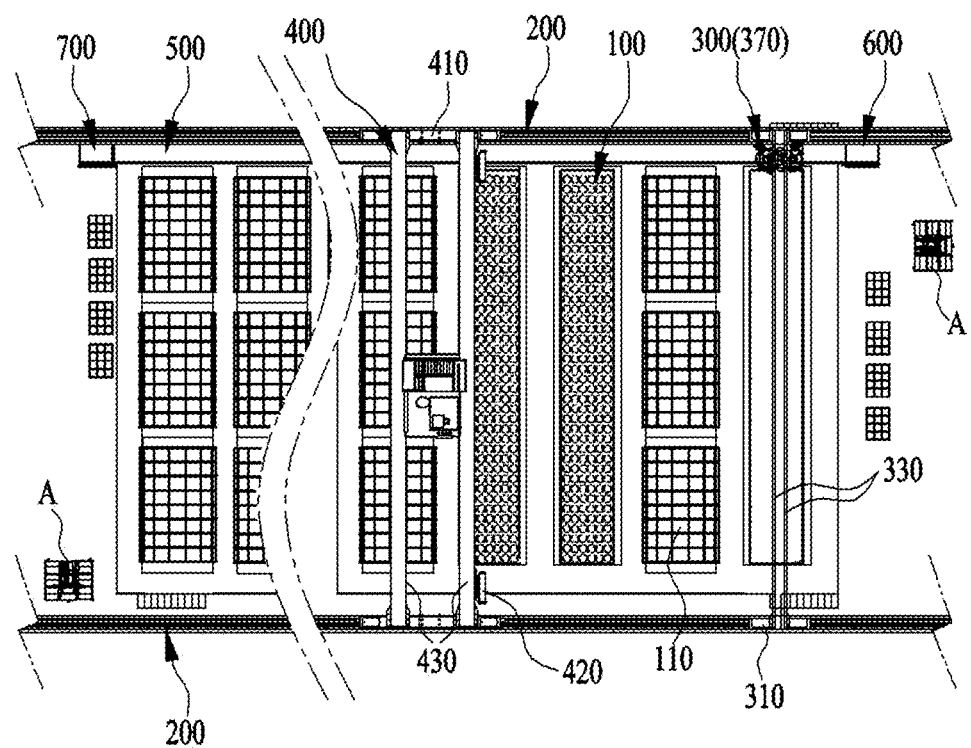
FIG. 1 is a plan view illustrating an automated graphitization apparatus according to a conventional art.
Figure 2:
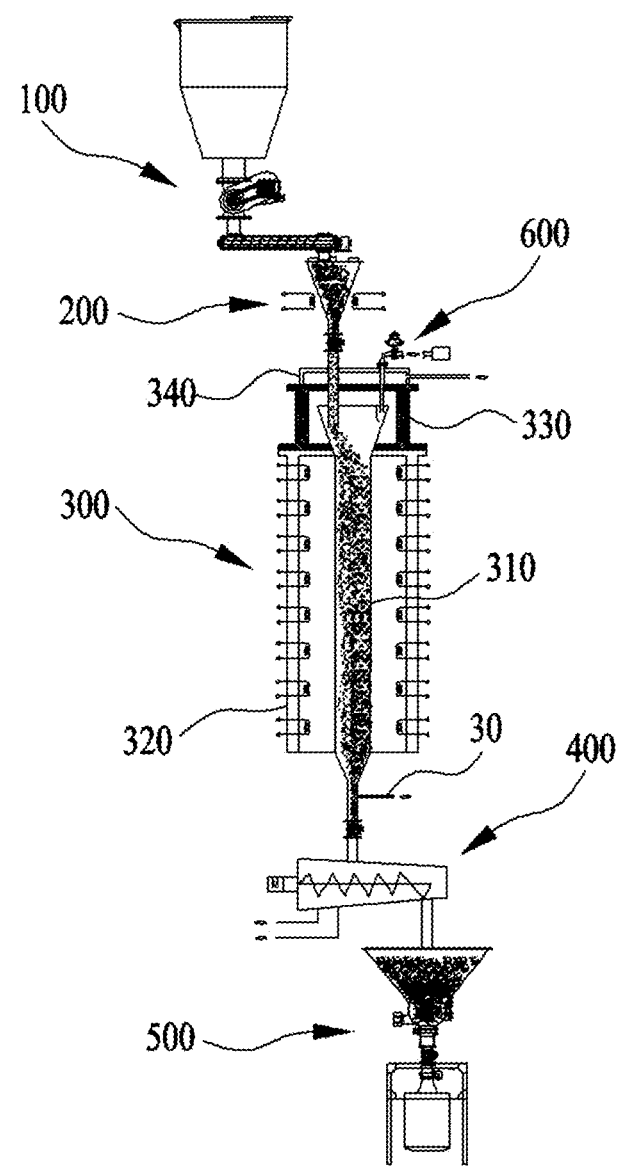
FIG. 2 is a front view illustrating a vertical graphitization furnace system according to a conventional art.
Figure 3:
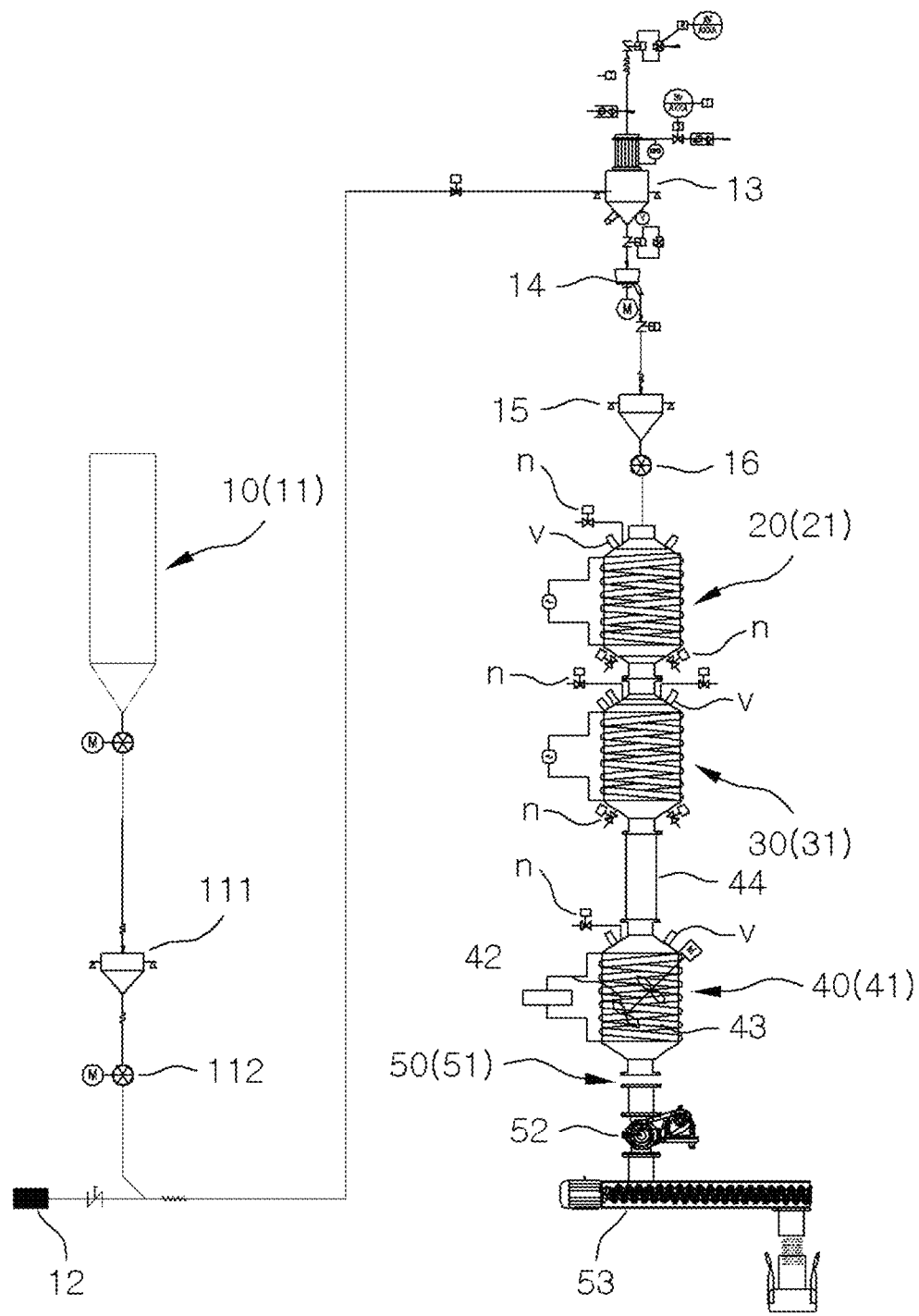
FIG. 3 is a configuration diagram illustrating a multistage vertical graphitization furnace system according to the present invention.
Figure 4:
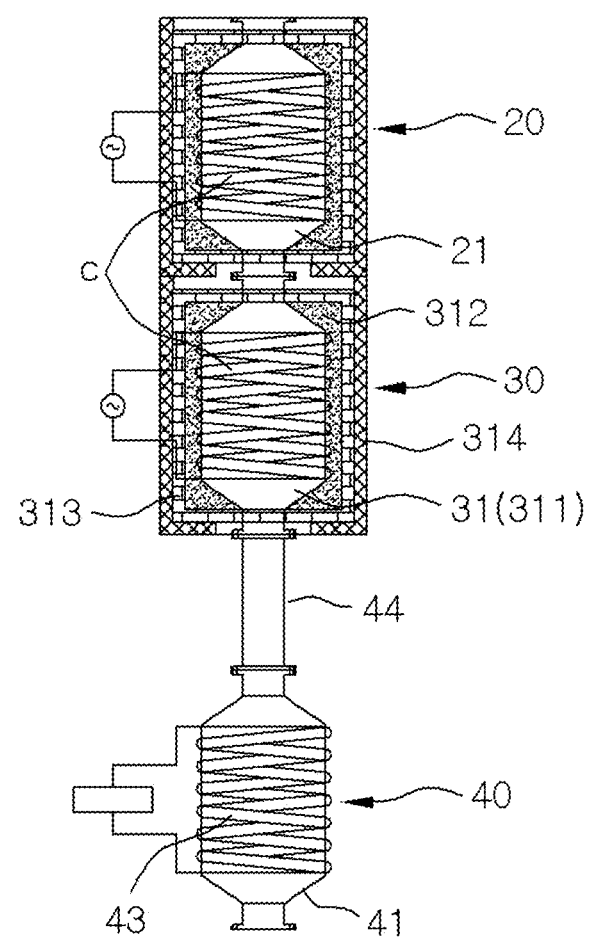
FIG. 4 is a cross-sectional enlarged view schematically illustrating a low-temperature treatment part, a high-temperature treatment part, and a cooling part of the multistage vertical graphitization furnace system according to the present invention.

Referring to FIGS. 3 and 4, a multistage vertical graphitization furnace system according to the present invention includes: a feed part 10 including a silo 11 where raw materials are stored; a low-temperature treatment part 20 which receives the raw materials from the silo 11 and heats the raw materials to 1500±300° C. to remove moisture and volatile components; a high-temperature treatment part 30 directly connected to the low-temperature treatment part 20 and further heating the raw materials, from which moisture and volatile components are removed in the low-temperature treatment part 20, at approximately 3000° C. to produce synthetic graphite; a cooling part 40 for water-cooling the synthetic graphite produced in the high-temperature treatment part 30; and a discharge part 50 for taking out the synthetic graphite discharged from the cooling part 40.

Hereinafter, detailed contents of the present invention will be described focusing on the above components. First, the feed part 10 includes: a silo 11 where raw materials are stored; a delivery means 12 located directly beneath the silo 11; and a first hopper 13, a table feeder 14, a second hopper 15, and a first rotary valve 16 sequentially provided above the low-temperature treatment part 20.

To ensure stable split feeding, which will be described later, precise quantitative feeding is required. An auxiliary hopper 111 for temporary storage of raw materials and an auxiliary rotary valve 112 for accurately controlling discharge volume can be additionally provided between the silo 11 and the delivery means 12.

The delivery means 12 transports the raw materials discharged from the silo 11 or the auxiliary hopper 111 to the first hopper 13 located at a higher position, and a high-pressure blower is used to transport the raw materials.

The table feeder 14 is positioned directly below the first hopper 13, and is configured to ensure stable quantitative discharge and continuous discharge of the raw materials.

The raw materials stored in the first hopper 13 are introduced into the low-temperature heat treatment furnace 21 of the low-temperature treatment part 20 through the table feeder 14 and the second hopper 15, wherein the first rotary valve 16 is synchronized with the second rotary valve 52 to ensure that the unit amount of raw materials per unit time is fed into a low-temperature heat treatment furnace 21 by split feeding. Detailed description of the unit amount will be provided in the description of the discharge part 50.

The low-temperature treatment part 20 includes a low-temperature heat treatment furnace 21 where raw materials stored in the second hopper 15 are introduced.

The low-temperature heat treatment furnace 21 includes a raw material inlet and a raw material outlet formed at the top and bottom, respectively. Additionally, the heating source for the low-temperature heat treatment furnace 21 is a high-frequency induction coil, and it is preferable to use a non-water-cooled graphite-coated coil (c) to enhance safety.

When the interior of the low-temperature heat treatment furnace 21 is maintained at 1500±300° C. for a predetermined retention time, volatile components of the charged raw materials are vaporized along with moisture, and the vaporized moisture and volatile components are discharged and externally through a plurality of vents (v) formed on the upper surface of the low-temperature heat treatment furnace 21, and then, are treated.

Moreover, if steam or gas increases suddenly during the temperature rise process in the low-temperature heat treatment furnace 21, pollution of the furnace or explosion may occur. Accordingly, a pressure gauge and a pyrometer are additionally installed for real-time inside the monitoring furnace, and the vents (v) are automatically opened when detecting abnormality.

The vents (v) are made of graphite material to enhance durability, considering the characteristic of being equipped in the high-temperature heat treatment furnace.

Furthermore, to alleviate the bottleneck phenomenon often occurring during the raw material discharge process, a plurality of inert gas injection means (n) which sprays inert gas at high pressure to dismantle the bottleneck portion are provided around the outlet of the low-temperature heat treatment furnace 21.

Moreover, the inert gas injection means (n) can also be provided around the raw material inlet of the low-temperature heat treatment furnace 21, and in this case, pressure is applied from the internal upper portion of the low-temperature heat treatment furnace 21 to alleviate the bottleneck phenomenon.

The cross-sectional structure of the low-temperature heat treatment furnace 21 is the same as that of the high-temperature heat treatment furnace 31, which will be described later.

The high-temperature treatment part 30 includes a high-temperature heat treatment furnace 31, which performs graphitization of the raw materials, i.e., makes synthetic graphite by heating the raw materials first heat-treated in the low-temperature heat treatment furnace 21 at temperature of 3000° C. for a predetermined period of time (e.g., ten hours).

The high-temperature heat treatment furnace 31 uses the same non-water-cooled graphite coil (c) as the heating source of the low-temperature heat treatment furnace 21, and has an inlet and an outlet formed on the upper and lower surfaces, respectively.

For graphitization of the raw materials, the temperature of 3000° C. must be maintained for a predetermined period of time (e.g., ten hours). For reinforcement of heat-resistance, as illustrated in FIG. 4, a main body 311 of the high-temperature heat treatment furnace 31 is sealed with an insulation material 312 to prevent heat loss and oxidation, and the surface of the insulation material 312 is finished with fireproof bricks 313. The fireproof bricks 313 are further protected by a case 314 made of a heat-resisting material.

Similar to the low-temperature heat treatment furnace 21, to alleviate the bottleneck phenomenon often occurring during the raw material discharge process, a plurality of inert gas injection means (n) are provided around the inlet and the outlet of the high-temperature heat treatment furnace 31.

Additionally, like the low-temperature heat treatment furnace 21, the high-temperature heat treatment furnace 31 additionally includes a pressure gauge and a pyrometer installed for real-time monitoring inside the furnace.

Meanwhile, the high-temperature heat treatment furnace 31 may have a structure where a plurality of unit heat treatment furnaces 31*a* are interconnected in a multilayered structure. The structure of the high-temperature heat treatment furnace 31 is easier in temperature control than a single integrated heat treatment furnace having the same volume as the plurality of unit heat treatment furnaces 31*a*, thereby enabling obtaining high-quality synthetic graphite, and enhancing production efficiency with increased production output.

Furthermore, the high-temperature heat treatment furnace 31 requires periodic maintenance due to deterioration of the fireproof bricks 313, and emergency situations may arise where one of the unit heat treatment furnace 31*a* is stopped due to unforeseen reasons. Compared to the integrated heat treatment furnace, the unit heat treatment furnace 31*a* is easier to prepare a replaceable unit heat treatment furnace 31*a* separately. In the state in which such a replaceable unit heat treatment furnace 31*a* is prepared, workers can cope with the improvement and repairing or emergency situations more effectively.

The cooling part 40 forcibly cools the synthetic graphite discharged at 3000° C. from the high-temperature heat treatment furnace 31 to enhance production efficiency, and includes: a cooling chamber 41 connected to the outlet of the high-temperature heat treatment furnace 31; an agitator 42 installed inside the cooling chamber 41; and a water-cooling tube 43 which surrounds the exterior of the cooling chamber 41 and through which cooling water flows.

The agitator 42 is configured to make the synthetic graphite repeatedly get in contact with the inner wall of the cooling chamber 41 with which the water-cooling tube 43 is in close contact, thereby enhancing cooling efficiency. Meanwhile, the agitator 42 crushes partially agglomerated lumps during the graphitization process to improve the fluidity of synthetic graphite, thereby facilitating subsequent processes. The above may be omitted as needed.

Furthermore, the cooling chamber 41 may include vents (v), inert gas injection means (n), a pressure gauge, and a pyrometer, with the same use purposes as the low-temperature heat treatment furnace 21 and high-temperature heat treatment furnace 31. Especially, when the bottleneck phenomenon occurs at the outlet of the cooling chamber 41, it is difficult to split-input the raw materials, so it may cause process delays and deterioration in quality of synthetic graphite.

Therefore, as a more proactive bottleneck resolution measure, it is preferable for the inert gas injection means (n) to be equipped to spray inert gas at high pressure from the upper portion of the cooling chamber 41 toward the outlet.

Meanwhile, when the synthetic graphite discharged from the high-temperature heat treatment furnace 31 is directly charged into the cooling chamber 41, the cooling efficiency of the water-cooling tubes 43 is deteriorated. Accordingly, a buffer part 44 is placed between the high-temperature heat treatment furnace 31 and the cooling chamber 41 to allow the synthetic graphite to undergo primary cooling while the synthetic graphite passes through the buffer part 44.

Additionally, to enhance cooling efficiency, a cooling means such as an air-cooling fan or a water-cooling tube 43 may be additionally provided on the peripheral surface of the buffer part 44.

The discharge part 50 includes: a gate 51 connected to the outlet of the cooling chamber 41; and a second rotary valve 52 and a screw conveyor 53 sequentially arranged below the gate 51 and interconnected with each other. A ton bag (t) for discharge is placed at the discharge side of the screw conveyor 53.

When the gate 51 is opened, the second rotary valve 52 discharges the synthetic graphite at a unit amount per hour by counting the number of rotations of a valve body. After the unit amount is discharged, the first rotary valve 16 is activated to replenish a predetermined amount of raw materials per hour into the low-temperature heat treatment furnace 21.

In addition, the raw material input through the first rotary valve 16 is operated in the split input manner, considering the maximum capacity and retention time (10 hours) of the high-temperature heat treatment furnace 31. That is, if the maximum capacity of the high-temperature heat treatment furnace 31 is two tons, the unit amount per hour is 200 kg and is input into the low-temperature heat treatment furnace 21.

Meanwhile, newly introduced raw materials into the low-temperature heat treatment furnace 21 are positioned at the upper portion inside the furnace, thereby effectively removing gases, moisture, and volatile components. Thereafter, while the raw materials descend within the low-temperature heat treatment furnace 21 in a stepwise manner, residual impurities are completely removed, and then, the materials are introduced into the high-temperature heat treatment furnace 31 to obtain high-quality synthetic graphite.

While the present invention has been particularly shown and described with reference to exemplary embodiments thereof, it will be understood by those of ordinary skill in the art that the scope of the present invention is not limited thereto, and the scope of the present invention can encompass not only the embodiments of the present invention but also those substantially equivalent thereto. Moreover, it will be understood by those of ordinary skill in the art that various changes, modifications, and equivalents may be made therein without departing from the technical idea and scope of the present invention.

What is claimed is:

1. A multistage vertical graphitization furnace system comprising:
   a feed part including a silo where raw materials are stored, a delivery part having a high-pressure blower for rapidly supplying the raw materials discharged from the silo using the high-pressure blower, and a first hopper storing the raw materials introduced by the delivery part;
   a low-temperature treatment part having a low-temperature heat treatment furnace which receives the raw materials from the feed part, and heats the raw materials to remove impurities;
   a high-temperature treatment part directly connected to the low-temperature treatment part, and having a high-temperature heat treatment furnace, which heats the raw materials discharged from the low-temperature heat treatment furnace to produce synthetic graphite;
   a cooling part including a cooling chamber connected to an outlet of the high-temperature heat treatment furnace and a water-cooling tube which surrounds the outside of the cooling chamber and through which cooling water flows; and
   a discharge part taking out the synthetic graphite discharged from the cooling part.

2. The multistage vertical graphitization furnace system according to claim 1, wherein the low-temperature heat treatment furnace has an inlet and an outlet formed at the top and bottom thereof, respectively, and a heating source of the low-temperature heat treatment furnace is a high-frequency induction coil
   wherein the high-temperature heat treatment furnace has an inlet and an outlet formed at the top and bottom thereof, respectively, and a heating source of the high-temperature heat treatment furnace is a high-frequency induction coil.

3. The multistage vertical graphitization furnace system according to claim 2, wherein a body of the high-temperature heat treatment furnace is sealed with an insulation material, the surface of the insulation material is finished with fireproof bricks, and the fireproof bricks are protected by a case made of a heat-resisting material, and
   wherein a cross-sectional structure of the low-temperature heat treatment furnace is the same as the high-temperature heat treatment furnace.

4. The multistage vertical graphitization furnace system according to claim 1, wherein a pressure gauge and a pyrometer are additionally installed inside the low-temperature heat treatment furnace for real-time monitoring, the furnace has a plurality of vents, and when detecting abnormality, the plurality of vents are automatically opened.

5. The multistage vertical graphitization furnace system according to claim 1, wherein a buffer part is arranged between the high-temperature heat treatment furnace and the cooling chamber so that synthetic graphite is initially cooled while passing through the buffer part.

6. The multistage vertical graphitization furnace system according to claim 1, wherein the discharge part includes: a gate connected to the outlet of the cooling chamber; and a second rotary valve and a screw conveyor sequentially arranged below the gate and interconnected with each other.

7. The multistage vertical graphitization furnace system according to claim 6, wherein when the gate is opened, the second rotary valve discharges the synthetic graphite at a unit amount per hour by counting the number of rotations of a valve body, after the unit amount is discharged, and the first rotary valve is activated to replenish a predetermined amount of raw materials per hour into the low-temperature heat treatment furnace, and wherein the first rotary valve split-feeds the raw materials based on the maximum capacity and retention time of the high-temperature heat treatment furnace.

8. The multistage vertical graphitization furnace system according to claim 1, wherein an inert gas injector is provided in the cooling chamber to inject inert gas at high pressure from the top of the cooling chamber towards the outlet.

9. A multistage vertical graphitization furnace system comprising:
   a feed part including a silo where raw materials are stored, a delivery part having a high-pressure blower for rapidly supplying the raw materials discharged from the silo using the high-pressure blower, and a first hopper storing the raw materials introduced by the delivery part;

a low-temperature treatment part having a low-temperature heat treatment furnace which receives the raw materials from the feed part, and heats the raw materials to remove impurities;

a high-temperature treatment part directly connected to the low-temperature treatment part, and having a high-temperature heat treatment furnace, which heats the raw materials discharged from the low-temperature heat treatment furnace to produce synthetic graphite;

a cooling part including a cooling chamber connected to an outlet of the high-temperature heat treatment furnace and a water-cooling tube which surrounds the outside of the cooling chamber and through which cooling water flows; and a discharge part taking out the synthetic graphite discharged from the cooling part, wherein the feed part further includes an auxiliary hopper for temporary storage of the raw materials and an auxiliary rotary valve for accurately controlling discharge volume are additionally provided between the silo and the delivery part.

10. The multistage vertical graphitization furnace system according to claim 9, further comprising:

a table feeder which is provided directly below the first hopper to stably perform quantitative discharge and continuous feeding of the raw materials.

11. The multistage vertical graphitization furnace system according to claim 9, wherein the furnace has a plurality of vents made of graphite material, and a plurality of inert gas injector for injecting inert gas.

\* \* \* \* \*